US011846359B2

(12) United States Patent
Huang

(10) Patent No.: US 11,846,359 B2
(45) Date of Patent: Dec. 19, 2023

(54) CONSTANT PRESSURE VALVE FOR INFLATABLE PRODUCT AND INFLATABLE PRODUCT

(71) Applicant: BESTWAY INFLATABLES & MATERIAL CORP., Shanghai (CN)

(72) Inventor: Shuiyong Huang, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 17/954,153

(22) Filed: Sep. 27, 2022

(65) Prior Publication Data

US 2023/0304592 A1    Sep. 28, 2023

(30) Foreign Application Priority Data

Mar. 28, 2022   (CN) .......................... 202220727824.9

(51) Int. Cl.
*F16K 17/04*   (2006.01)
*F16K 15/20*   (2006.01)
(Continued)

(52) U.S. Cl.
CPC ........ *F16K 15/202* (2013.01); *F16K 15/1441* (2021.08); *F16K 15/1825* (2021.08);
(Continued)

(58) Field of Classification Search
CPC ...... Y10T 137/7823; Y10T 137/88062; G05D 16/0655; F16K 15/207; F16K 17/048
See application file for complete search history.

(56) References Cited

U.S. PATENT DOCUMENTS 2,012,721 A * 8/1935 Johnson ................ F02N 99/006
                                                     137/565.25
2,359,111 A * 9/1944 Hughes .............. G05D 16/0655
                                                     137/71
(Continued)

FOREIGN PATENT DOCUMENTS

JP          51159038 U      12/1976
JP          11159641 A       6/1999

OTHER PUBLICATIONS

Extended European Search Report dated May 15, 2023 (dated May 15, 2023) issued on related European patent application 22197672.3 by the European Patent Office.

*Primary Examiner* — Kevin F Murphy
(74) *Attorney, Agent, or Firm* — DICKINSON WRIGHT PLLC

(57) ABSTRACT

A constant pressure valve for an inflatable product is provided. The constant pressure valve comprises: a housing defining an airflow channel within. A first sealing seat is disposed in the airflow channel and a first through hole is formed in the first sealing seat. An inflation valve core comprises: a first actuating assembly and a first valve head. The first actuating assembly is configured to drive the first valve head to disengage from the first through hole, or to engage with the first through hole in a sealing manner. The constant pressure valve is switchable between an inflation state, in which the first valve head is disengaged from the first through hole, and the airflow channel is unblocked; and a cut-off state in which the first valve head is engaged with the first through hole in a sealing manner, and the airflow channel is blocked by the first valve head.

8 Claims, 5 Drawing Sheets

(51) Int. Cl.
*F16K 15/18* (2006.01)
*F16K 15/14* (2006.01)
*G05D 16/06* (2006.01)

(52) U.S. Cl.
CPC .......... *F16K 15/207* (2013.01); *F16K 17/048* (2013.01); *G05D 16/0655* (2013.01); *Y10T 137/7823* (2015.04); *Y10T 137/88062* (2015.04)

(56) References Cited

U.S. PATENT DOCUMENTS

| | | | | |
|---|---|---|---|---|
| 3,149,828 | A | * | 9/1964 | Schutmaat .......... G05D 16/0655 411/972 |
| 3,159,388 | A | * | 12/1964 | Wall .................. G05D 16/0655 137/505.42 |
| 3,920,033 | A | * | 11/1975 | Ferrando ............ B63C 11/2209 137/81.2 |
| 10,465,810 | B2 | * | 11/2019 | Ehrlich ............. B60C 23/00354 |
| 2006/0048822 | A1 | | 3/2006 | Massengale et al. |
| 2010/0001223 | A1 | | 1/2010 | Tschurtz |

\* cited by examiner

CONSTANT PRESSURE VALVE FOR INFLATABLE PRODUCT AND INFLATABLE PRODUCT

CROSS-REFERENCE TO RELATED APPLICATION

This Application claims priority from Chinese Application CN202220727824.9 filed Mar. 28, 2022 in China, the disclosure of which is incorporated herein by reference in its entirety.

BACKGROUND

1. Field

Apparatuses and methods consistent with example embodiments relate to the field of inflatable articles, and in particular, to a constant pressure valve for an inflatable product.

2. Description of the Related Art

Inflatable products are generally light weight and easy to store and carry, and are therefore widely used as outdoor products, water products, and household products, such as inflatable mattresses, inflatable loungers, and inflatable toys.

When an inflatable product is inflated, air pressure inside the inflatable product may be monitored to prevent over-inflation to avoid damage to the inflatable product. In the related art, a user may empirically monitor an air pressure inside an inflatable product or use a pressure sensor to monitor the air pressure. Such empirical monitoring is often not reliable, and monitoring using a pressure sensor may increase the cost of the inflatable product. Thus, improvements are desired to address the foregoing problems in the related art.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, a constant pressure valve comprises: a housing defining therewithin an airflow channel, a first sealing seat disposed in the airflow channel and a first through hole formed through the first sealing seat; and an inflation valve core comprising: a first actuating assembly and a first valve head, wherein the first actuating assembly is configured to drive the first valve head to disengage from the first through hole, or to engage with the first through hole in a sealing manner, wherein the constant pressure valve is switchable between an inflation state in which the first valve head is disengaged from the first through hole and the airflow channel is unblocked; and a cut-off state in which the first valve head is engaged with the first through hole in a sealing manner, and the airflow channel is blocked by the first valve head.

The first actuating assembly may comprise: a first pressure-bearing plate having a first side that faces the airflow channel and a second side opposite the first side; a first elastic member connected to the second side of the first pressure-bearing plate; and a first valve stem connected to the first side of the first pressure-bearing plate; wherein the first valve head is disposed on the first valve stem; and wherein, upon action of an inflation pressure, the first pressure-bearing plate moves against a pressure of the first elastic member.

The constant pressure valve may further comprise: a first piston chamber defined within in the housing, wherein the first elastic member is mounted in the first piston chamber, and the first pressure-bearing plate seals the first piston chamber and is reciprocable relative to the first piston chamber in an axial direction of the first piston chamber.

The constant pressure valve may further comprise: a second sealing seat disposed in the airflow channel in an upstream direction of the first sealing seat, and a second through hole formed through the second sealing seat; wherein the constant pressure valve further comprises: an air intake valve core disposed in the upstream direction of the inflation valve core, the air intake valve core comprising: a second actuating assembly and a second valve head, wherein the second actuating assembly is configured to drive the second valve head to disengage from the second through hole, or to engage with the second through hole in a sealing manner; and wherein the constant pressure valve is further switchable into an initial state in which the second valve head is engaged with the second through hole in a sealing manner and the airflow channel is blocked by the second valve head; and wherein in the inflation state, the second valve head is disengaged from the second through hole; and wherein in the cut-off state, the second valve head is engaged with the second through hole in a sealing manner, and the airflow channel is blocked by the second valve head.

The second actuating assembly may comprise: a second pressure-bearing plate having a first side that faces the airflow channel and a second side opposite the first side; a second elastic member connected to the second side of the second pressure-bearing plate; and a second valve stem connected to the first side of the second pressure-bearing plate; wherein the second valve head is disposed on the second valve stem; and wherein, upon action of the inflation pressure, the second pressure-bearing plate moves against a pressure of the second elastic member.

The constant pressure valve may further comprise: a second piston chamber defined within the housing, wherein the second elastic member is mounted in the second piston chamber, and the second pressure-bearing plate seals the second piston chamber and is reciprocable relative to the second piston chamber in an axial direction of the second piston chamber.

Each of the first pressure-bearing plate and the second pressure-bearing plate may comprise a flexible member disposed on a circumferential edge thereof, wherein the flexible member is in sealable contact with a sidewall of a corresponding one of the first piston chamber and the second piston chamber.

The flexible member may be made of silicone.

The first piston chamber may comprise therewithin an accommodating cavity accommodating therewithin the first elastic member; wherein the constant pressure valve further comprises an adjustment end cover which is axially movable and covers an opening of the accommodating cavity; and wherein the first elastic member abuts against the adjustment end cover.

The adjustment end cover may be threaded to the accommodating cavity and may be moveable by means of a ratchet mechanism.

The first sealing seat may be connected to the second sealing seat, thereby forming a barrel; the first through hole is located in a first end surface of the barrel, and the first valve head extends through the first through hole and into the barrel; and the second through hole is located in a second end surface of the barrel, and the second valve head is located outside the barrel.

According to an aspect of another example embodiment, an inflatable product, may comprise: a product body, an inflation port connected to the product body; and a constant pressure valve, described above, wherein the airflow channel of the constant pressure valve is connected to the inflation port.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
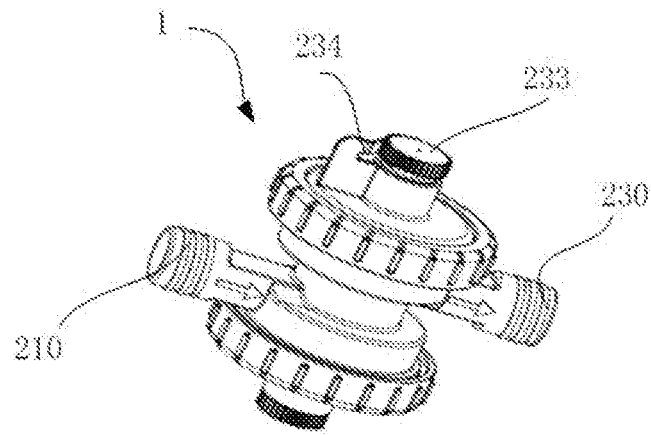
FIG. 1 schematically illustrates a constant pressure valve for an inflatable product according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Figure 2:
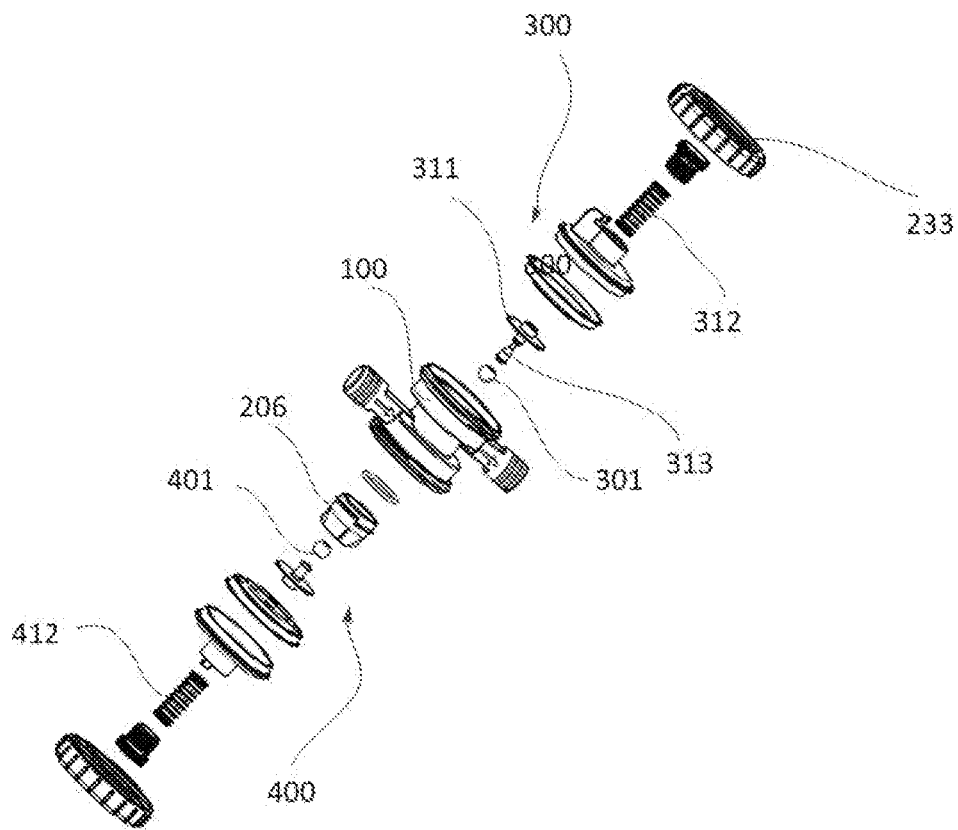
FIG. 2 is an exploded view of the constant pressure valve of FIG. 1.
Figure 3A:
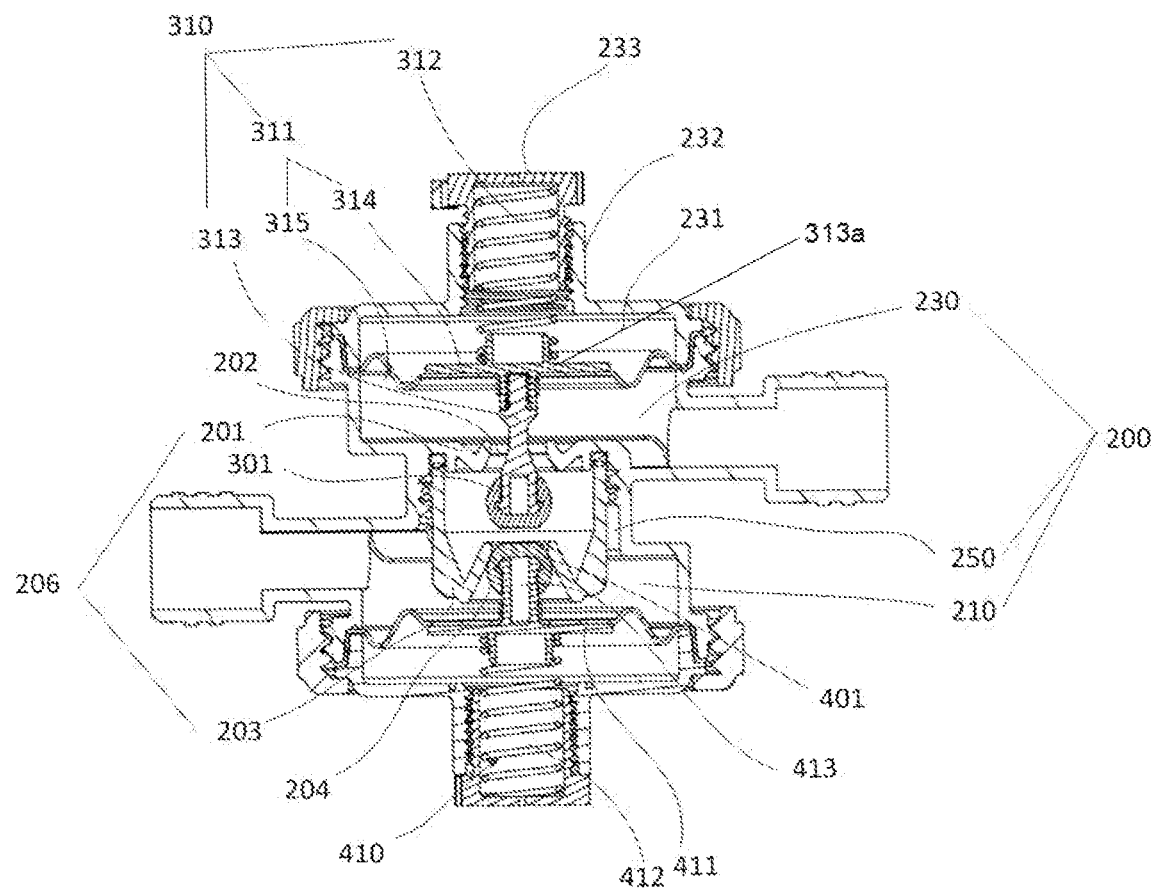
FIGS. 3A and 3B cross-sectional views of the constant pressure valve of FIG. 1 according to different example embodiments.
Figure 3B:
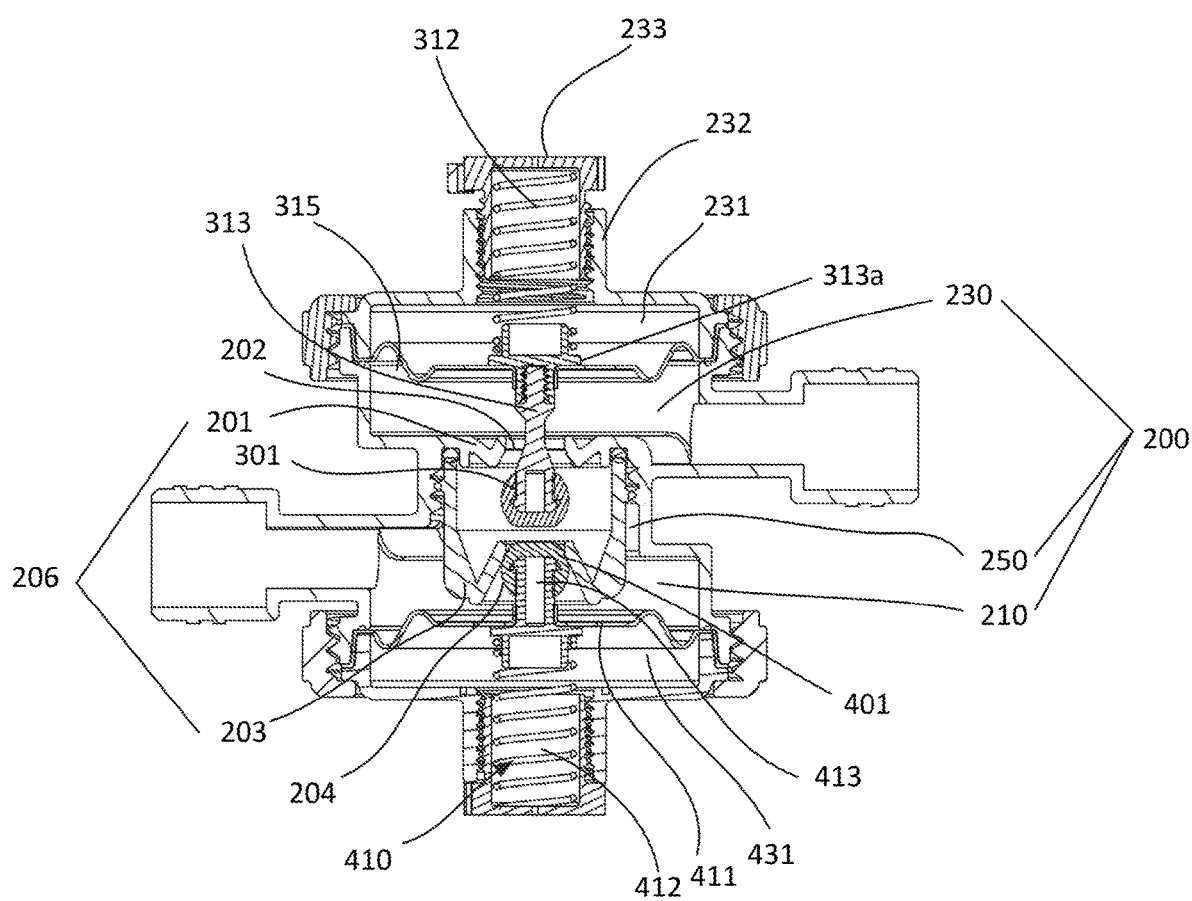
Figure 4:
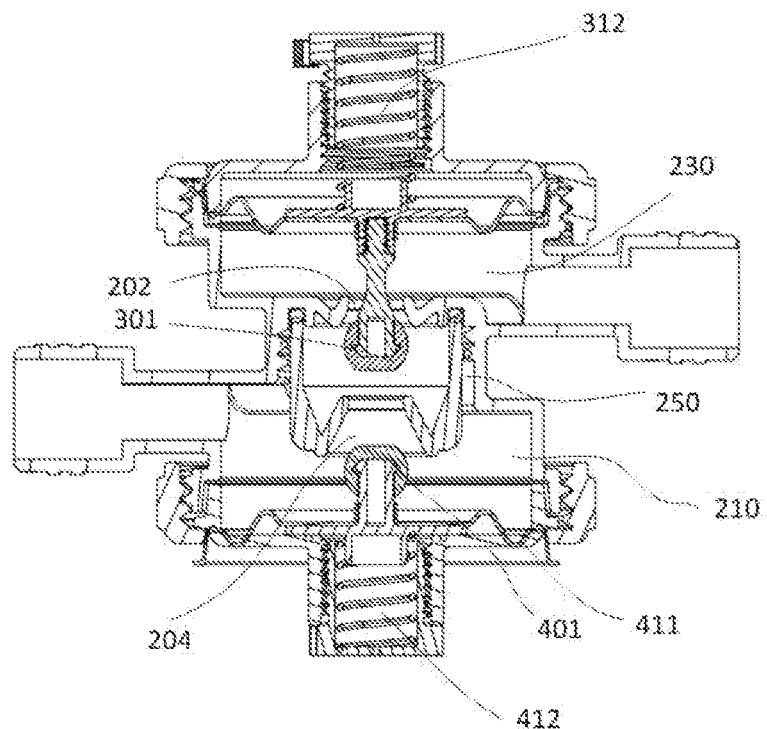
FIG. 4 schematically illustrates a constant pressure valve in a state of inflating, according to an example embodiment.
Figure 5:
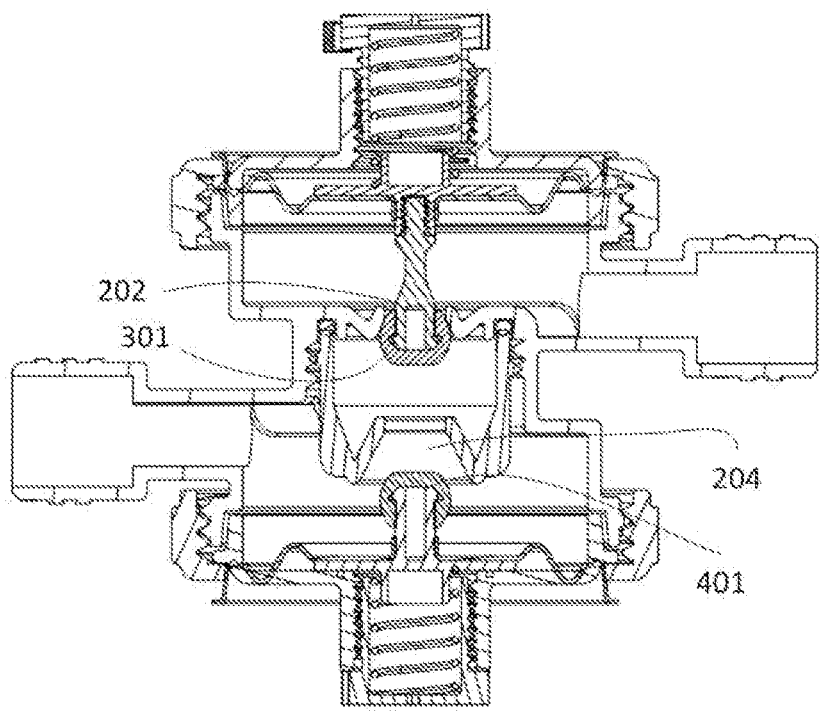
FIG. 5 schematically shows a constant pressure valve at the end of an inflating state, according to an example embodiment.
Figure 6:
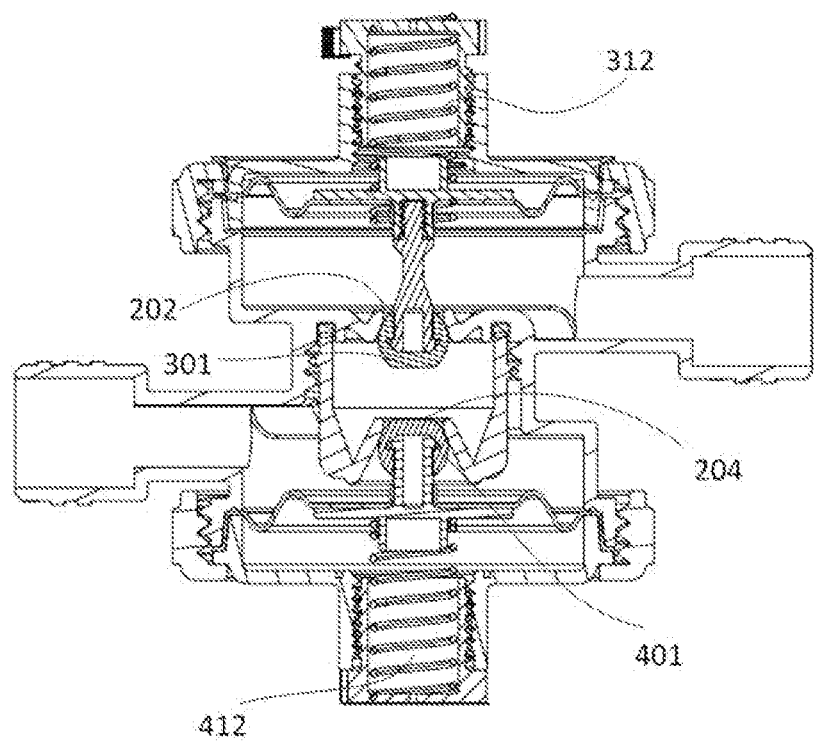
FIG. 6 schematically illustrates a constant pressure valve with an external air source removed, according to an example embodiment.

FIG. 1 schematically illustrates a constant pressure valve 1 for an inflatable product according to an example embodiment. FIG. 2 is an exploded view of FIG. 1, and FIGS. 3A and 3B are cross-sectional views of FIG. 1, according to different example embodiments. As shown in FIGS. 1, 2, 3A, and 3B, the constant pressure valve 1 comprises: a housing 100 and an airflow channel 200 disposed within the housing 100. The airflow channel 200 is configured to provide communication between an external air source and an inflatable product 2. A first sealing seat 201, having a first through hole 202 formed therein, is disposed in the airflow channel 200. The constant pressure valve 1 further comprises an inflation valve core 300 comprising a first actuating assembly 310 and a first valve head 301. The first actuating assembly 310 drives the first valve head 301 to disengage from the first through hole 202, thereby allowing air flow through the first through hole 202, or to engage with the first through hole 202, thereby sealing the first through hole 202.

For the constant pressure valve 1, the first sealing seat 201 divides the airflow channel 200 into an inflation pipe section 230 and an air intake pipe section 210. The inflation pipe section 230 is configured to be in communication with the inflatable product 2, and the air intake pipe section 210 is configured to be in communication with the external air source. The external air source may be, for example, an air pump. During the use of the constant pressure valve 1, the air intake pipe section 210 is connected to the external air source. The constant pressure valve 1 is configured to be switchable between an inflation state and a cut-off state. In the inflation state, air pressure in the inflation pipe section 230 is relatively low, and the first actuating assembly 310 drives the first valve head 301 disengage from the first through hole 202 so as to unblock the airflow channel 200. For example, in the inflation state, air on one side of the first sealing seat 201 is in fluid communication with air on the other side through the first through hole 202, and the elements of the constant pressure valve are configured to transmit air to inflate the inflatable product 2. As an air pressure in the inflatable product 2 gradually increases, the air pressure in the inflation pipe section 230 gradually increases accordingly. Under the action of inflation pressure, the first actuating assembly 310 drives the first valve head 301 to approach the first through hole 202. After the air pressure in the inflatable product 2 reaches a predetermined pressure, the air pressure in the inflation pipe section 230 is equal to the air pressure in the inflatable product 2, thereby making the constant pressure valve 1 enter the cut-off state. In the cut-off state, the predetermined pressure continues acting on the first actuating assembly 310 to enable the first valve head 301 to engage with the first through hole 202 in a sealing manner, such that the airflow channel 200 is cut off. For example, the air on one side of the first sealing seat 201 is isolated from the air on the other side by the first valve head 301, and the inflation is finished.

It should be noted that after the inflation is finished, the first valve head 301 may remain in sealing engagement with the first through hole 202 to maintain the inflatable product 2 at the predetermined pressure.

The air pressure in the inflation pipe section 230 interacts with the first actuating assembly 310 in such a way that the first valve head 301 is automatically disengaged from the first through hole 202, or is automatically engaged with the first through hole 202 in a sealing manner, thereby implementing the inflation of the inflatable product 2 or the stopping of the inflation of the inflatable product 2. In other words, under the joint action of the air pressure, in the inflation pipe section 230, and the first actuating assembly 310, the first valve head 301 is automatically disengaged from, or engaged with the first through hole 202 in a sealing manner, to implement automatic monitoring of an inflation process for the inflatable product 2. Accordingly, it is not necessary for a user to manually monitor the inflation of the inflatable product 2, and it is additionally not necessary to provide a pressure sensor. Thus, a cost of the inflatable product may be lowered. After the inflation is finished, the constant pressure valve 1 may maintain the inflatable product 2 at the predetermined pressure, which may provide ease of use.

As shown in FIGS. 2, 3A, and 3B, a second sealing seat 203 with a second through hole 204 is disposed upstream of the first sealing seat 201. The constant pressure valve 1 further comprises an air intake valve core 400 disposed upstream of the inflation valve core 300. The air intake valve core 400 comprises a second actuating assembly 410 and a second valve head 401. The second actuating assembly 410 drives the second valve head 401 to disengage from the second through hole 204, enabling air flow through the second through hole 204, or to engage with the second through hole 204, thus sealing the second through hole 204. In this structure, a pipe section between the second sealing seat 203 and the first sealing seat 201 forms an intermediate pipe section 250. During the use of the constant pressure valve 1, in an initial state (that is, the inflation of the constant pressure valve 1 has not started yet) before inflation, an air pressure in the air intake pipe section 210 is relatively low (for example, is equal to an air pressure of surrounding environment). The second actuating assembly 410 drives the second valve head 401 to engage with the second through hole 204 in a sealing manner, and the airflow channel 200 is cut off. When the inflation is started, the external air source is connected to the air intake pipe section 210 to fill air into the air intake pipe section 210. The air pressure in the air intake pipe section 210 gradually increases. Under the action of an inflation pressure in the air intake pipe section 210, the second actuating assembly 410 drives the second valve head 410 to disengage from the second through hole 204. In this case, the first valve head 301 is disengaged from the first through hole 202, thus the airflow channel 200 is unblocked to enable inflation of the inflatable product 2. After the inflation is finished, the external air source is removed, the air pressure in the air intake pipe section 210 decreases again, and the second actuating assembly 410 drives the second valve head 401 to engage with the second through hole 204 in a sealing manner again. Herein, the terms "upstream" and "downstream" are used relative to an airflow direction.

By means of the arrangements of the second sealing seat 203 and the air intake valve core 400, after the inflation of the inflatable product 2 is finished, the first valve head 301 and the second valve head 401 provide double sealing for the airflow channel 200. Even if the sealing of either of the first valve head 301 of the second valve head 401 accidentally fails, air pressure in the inflatable product 2 may still be maintained at the predetermined pressure, thereby improving the reliability of the inflatable product 2.

An example structure of the first actuating assembly 310 is described below.

As shown in FIG. 3A, the first actuating assembly 310 comprises a first pressure-bearing plate 311, a first elastic member 312, and a first valve stem 313. The first pressure-bearing plate 311 has a first side that faces the airflow channel 200, and a second side that faces away from the airflow channel 200. In this way, the first pressure-bearing plate 311 can bear an air pressure in the airflow channel 200. The first valve stem 313 is connected to the first pressure-bearing plate 311 by a seat portion 313a. The first elastic member 312 is connected to the second side of the first pressure-bearing plate 311. The first valve stem 313 is connected to the first side of the first pressure-bearing plate 311. The first valve head 301 is disposed on the corresponding first valve stem 313. In this structure, the first pressure-bearing plate 311 has a relatively large area, thus bears a relatively large pressure of the air in the airflow channel 200, and therefore is more likely to reciprocate under an interaction between the air pressure in the airflow channel 200 and the elastic force of the first elastic member 312, which, in turn drives the first valve stem 313 and the first valve head 301 to reciprocate to conveniently unblock or cut off the airflow channel 200.

According to one or more example embodiments, the first elastic member 312 is a coil spring. The coil spring has a small size and a large elasticity, which facilitates a reduction in the size of the constant pressure valve 1.

Further, as shown in FIG. 3A, a first piston chamber 231 is disposed in the housing 100. The first pressure-bearing plate 311 seals the first piston chamber 231 and is reciprocably moveable relative to the first piston chamber 231 in an axial direction of the first piston chamber 231. The first elastic member 312 is located in the first piston chamber 231. With this structure, the first pressure-bearing plate 311 isolates the airflow channel 200 from the first piston chamber 231 in a sealing manner to provide that, during inflation, a pressure difference between the first side of the first pressure-bearing plate 311 and the second side of the first pressure-bearing plate 311 changes significantly with the air pressure in the inflation pipe section 230, so that the first pressure-bearing plate 311 is more likely to move to conveniently unblock or cut off the airflow channel 200.

A flexible member 315 is provided on a circumferential edge of the first pressure-bearing plate 311. The flexible member 315 is in slidable sealing contact with, or is sealingly connected to, a sidewall of the first piston chamber 231.

According to one or more example embodiments, the first pressure-bearing plate 311 may include a rigid stress plate 314 extending radially outward from the seat portion 313a of the first valve stem 313. The flexible member 315 may be located at a circumferential edge of the rigid stress plate 314. According to this example, both the first elastic member 312 and the first valve stem 313 may be connected to the rigid stress plate 314. The flexible member 315 is in slidable sealing contact with a sidewall of the first piston chamber 231. In this case, the flexible member 315 acts as a sliding sealing member.

According to another example embodiment, the flexible member 315 is sealably connected to a sidewall of the first piston chamber 231. During inflation, when the air pressure in the inflation pipe section 230 changes, the rigid stress plate 314 reciprocates, and the flexible member 315 is stretched or restores similarly to a rubber band. The flexible member 315 may be an elastic sheet. For example, the flexible member 315 may be a silicone sheet. Compared to the sliding sealing member, such a flexible member is more resistant to abrasion, which facilitates the maintenance of the constant pressure valve 1.

Specifically, the rigid stress plate 314 may be made of a material such as metal or hard plastic. The flexible plate 315 may be made of silicone.

According to another example embodiment shown in FIG. 3B, the rigid plate 314 may be omitted from the pressure-bearing plate 311. The seat portion 313a of the stem 313 may be mounted directly to the pressure-bearing plate which may include a single element which moves back and forth according to pressures on the two sides of the pressure-bearing plate 311. In this example, the pressure-bearing plate includes an outer circumference which contacts the inner walls of the first piston chamber 231. This pressure-bearing plate may include one or more portions such that it slides along the inner walls of the first piston chamber 231 or maintains contact with a portion of the inner walls of the first piston chamber and flexes back and forth with changes in pressure.

Still as shown in FIGS. 3A and 3B, the first piston chamber 231 is further configured with an accommodating cavity 232 accommodating the first elastic member 312 therein. An adjustment end cover 233, which is axially movable, covers an opening of the accommodating cavity 232. The first elastic member 312 abuts against the adjustment end cover 233. In this way, the following method may be used for adjusting the predetermined pressure of the inflatable product 2 as required. An axial direction of the adjustment end cover 233 may be changed to adjust the elastic force of the first elastic member 312 so as to change the air pressure in the inflation pipe section 230 (or the inflatable product 2) when the first valve head 301 is engaged with the first through hole 202 in a sealing manner. Such operations are simple and may facilitate operation by a user. For example, when the predetermined pressure of the inflatable product 2 is to be increased, the axial position of the adjustment end cover 233 may be adjusted to move it closer to the first piston chamber 231 to increase the elastic force of the first elastic member 312. When the predetermined pressure of the inflatable product 2 is to be decreased, the axial position of the adjustment end cover 233 may be adjusted to move farther away from the first piston chamber 231 to decrease the elastic force of the first elastic member 312.

According to one or more example embodiments, the adjustment end cover 233 is threadedly mounted on the accommodating cavity 232. In this way, air pressure values (which may be obtained through user experimentation) may be labeled in a circumferential direction of the adjustment end cover 233. To adjust the predetermined pressure of the inflatable product 2, the adjustment end cover 233 may be simply rotated to be aligned with a position at a corresponding air pressure value. In addition, a ratchet mechanism 234 (as shown in FIG. 1) may be further disposed on the adjustment end cover 233 and the accommodating cavity 232 to keep the adjustment end cover 233 at a required position, in order to prevent the predetermined air pressure value from being below an expected value during inflation due to any possible loosening of the adjustment end cover 233. For example, ratchet teeth may be provided on the adjustment end cover 233, and a matching ratchet may be disposed on the accommodating cavity 232; and vice versa. Optionally, the adjustment of the adjustment end cover 233 may be completed before the constant pressure valve 1 or the inflatable product 2 is delivered.

The structure of the second actuating assembly 410 may be analogous to that of the first actuating assembly 310, except that the second actuating assembly 410 may comprise no adjustment end cover or may comprise an adjustment end cover. For simplicity, the structure of the second actuating assembly 410 is will not be described herein again.

Still as shown in FIGS. 3A and 3B, the first sealing seat 201 is connected to the second sealing seat 203 to form a barrel 206. In this way, the first sealing seat 201 and the second sealing seat 203 may be integrally formed, which may simplify the assembly of the first sealing seat 201 and the second sealing seat 203 in the airflow channel 200. In addition, the first through hole 202 is located in a first end surface of the barrel 206, and the first valve head 301 extends through the first through hole 202 and is located in the barrel 206. The second through hole 204 is located in a second end surface of the barrel 206, and the second valve head 401 is located outside the barrel 206.

Figure 7:
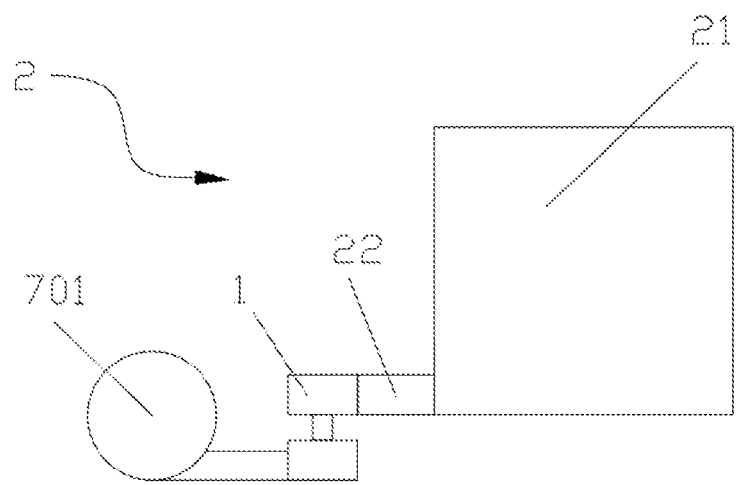
FIG. 7 schematically illustrates an inflatable product according to an example embodiment.

FIG. 7 schematically illustrates an inflatable product 2 according to an example embodiment. As shown in FIG. 7, the inflatable product 2 comprises a product body 21 and the constant pressure valve 1 according to one or more example embodiments described herein. The product body 21 includes the inflation port 22. The airflow channel 200 of the constant pressure valve 1 is connected to the inflation port 22. According to one or more example embodiments, the constant pressure valve 1 is removably mounted on the inflatable product 21. In this way, the constant pressure valve 1 can be conveniently maintained or replaced. Moreover, the constant pressure valve 1 may be used to inflate a plurality of inflatable products 21. According to one or more example embodiments, the constant pressure valve 1 is fixedly mounted on the inflatable product 2. In this way, the constant pressure valve 1 may maintain the air pressure in the inflatable product 2, without a need to separately close the inflation port 22 after the inflation is finished.

An example inflation process for the inflatable product 2 is described below.

In an initial state of the constant pressure valve 1 (as shown in FIGS. 3A and 3B), the inflatable product 2 is not inflated. A second elastic member 412 expands such that the second valve head 401 is engaged with the second through hole 204 in a sealing manner. The first elastic member 312 expands such that the first valve head 301 is disengaged from the first through hole 202. The entire airflow channel 200 is cut off.

During inflation, an external air source 701 is in communication with the airflow channel 200 of the constant pressure valve 1 to fill air in the airflow channel 200. The air pressure in the air intake pipe section 210 gradually increases to force the second pressure-bearing plate 411 to move to compress the second elastic member 412, thereby disengaging the second valve head 401 from the second through hole 204. In this case, the first valve head 301 and the first through hole 202 still remain disengaged. In this way, the entire airflow channel 200 is unblocked. Air flows through the inflation pipe section 210, a gap between the second valve head 401 and the second through hole 204, the intermediate pipe section 250, a gap between the first valve head 301 and the first through hole 202, and through the inflation pipe section 230 into the inflatable product 2 to implement the inflation of the inflatable product 2.

As the air pressure in the inflatable product 2 gradually increases, the air pressure in the inflation pipe section 230 also gradually increases. The first elastic member 312 is compressed to drive the first valve head 301 to approach the first through hole 202.

After the air pressure in the inflatable product 2 reaches the predetermined pressure, the first valve head 301 is engaged with the first through hole 202 in a sealing manner, and the airflow channel 200 is cut off to complete the inflation of the inflatable product 2. In this way, if leakage occurs from the inflatable product 2, the air pressure in the inflatable product 2 decreases, and the air pressure in the inflation pipe section 230 also decreases accordingly, such the first valve head 301 is disengaged from the first through hole 202 again and the airflow channel 200 is unblocked again to continue to inflate the inflatable product 2.

After the inflation of the inflatable product 2 is finished, the external air source may be removed. The air pressure in the air intake pipe section 210 decreases. The second elastic member 412 expands again, and the second valve head 401 is engaged with the second through hole 204 in a sealing manner again. In this case, the air pressure in the inflation pipe section 230 remains equal to the air pressure in the inflatable product 2. The first elastic member 312 is maintained in a compressed state, and the first valve head 301 remains in engagement with the first through hole 202 in a sealing manner. In this way, even if the external air source is removed, the predetermined pressure is still maintained in the inflatable product 2.

Matters of these example embodiments that are obvious to those of ordinary skill in the technical field to which these example embodiments pertain may not be described here in detail.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A constant pressure valve comprising:
a housing defining therewithin an airflow channel,
a first sealing seat disposed in the airflow channel and a first through hole formed through the first sealing seat; and
an inflation valve core comprising:
a first actuating assembly comprising:
a first pressure-bearing plate having a first side that faces the airflow channel and a second side opposite the first side;
a first elastic member connected to the second side of the first pressure-bearing plate; and
a first valve stem connected to the first side of the first pressure-bearing plate;
a first valve head,
wherein the first valve head is disposed on the first valve stem; and
wherein, upon action of an inflation pressure, the first pressure-bearing plate moves against a pressure of the first elastic member,
wherein the first actuating assembly is configured to drive the first valve head to disengage from the first through hole, or to engage with the first through hole in a sealing manner,
wherein the constant pressure valve is switchable between an inflation state in which the first valve head is disengaged from the first through hole and the airflow channel is unblocked; and a cut-off state in which the first valve head is engaged with the first through hole in a sealing manner, and the airflow channel is blocked by the first valve head;
a first piston chamber defined within in the housing, wherein the first elastic member is mounted in the first piston chamber, and the first pressure-bearing plate seals the first piston chamber and is reciprocable relative to the first piston chamber in an axial direction of the first piston chamber;
a second sealing seat disposed in the airflow channel in an upstream direction of the first sealing seat, and a second through hole formed through the second sealing seat;
an air intake valve core disposed in the upstream direction of the inflation valve core, the air intake valve core comprising:
a second actuating assembly comprising:
a second pressure-bearing plate having a first side that faces the airflow channel and a second side opposite the first side;
a second elastic member connected to the second side of the second pressure-bearing plate; and
a second valve stem connected to the first side of the second pressure-bearing plate;
and a second valve head;
wherein the second valve head is disposed on the second valve stem; and
wherein, upon action of the inflation pressure, the second pressure-bearing plate moves against a pressure of the second elastic member;
wherein the second actuating assembly is configured to drive the second valve head to disengage from the second through hole, or to engage with the second through hole in a sealing manner;
wherein the constant pressure valve is further switchable into an initial state in which the second valve head is engaged with the second through hole in a sealing manner and the airflow channel is blocked by the second valve head;
wherein in the inflation state, the second valve head is disengaged from the second through hole; and
wherein in the cut-off state, the second valve head is engaged with the second through hole in a sealing manner, and the airflow channel is blocked by the second valve head.

2. The constant pressure valve according to claim 1, further comprising:
a second piston chamber defined within the housing, wherein the second elastic member is mounted in the second piston chamber, and the second pressure-bearing plate seals the second piston chamber and is reciprocable relative to the second piston chamber in an axial direction of the second piston chamber.

3. The constant pressure valve according to claim 2, wherein each of the first pressure-bearing plate and the second pressure-bearing plate comprises a flexible member disposed on a circumferential edge thereof, wherein the flexible member is in sealable contact with a sidewall of a corresponding one of the first piston chamber and the second piston chamber.

4. The constant pressure valve according to claim 3, wherein the flexible member is made of silicone.

5. The constant pressure valve according to claim 1, wherein the first piston chamber comprises therewithin an accommodating cavity accommodating therewithin the first elastic member;
wherein the constant pressure valve further comprises an adjustment end cover which is axially movable and covers an opening of the accommodating cavity; and
wherein the first elastic member abuts against the adjustment end cover.

6. The constant pressure valve according to claim 5, wherein the adjustment end cover is threaded to the accommodating cavity and is moveable by means of a ratchet mechanism.

7. The constant pressure valve according to claim 1, wherein:
- the first sealing seat is connected to the second sealing seat, thereby forming a barrel;
- the first through hole is located in a first end surface of the barrel, and the first valve head extends through the first through hole and into the barrel; and
- the second through hole is located in a second end surface of the barrel, and the second valve head is located outside the barrel.

8. An inflatable product, comprising:
a product body,
an inflation port connected to the product body; and
the constant pressure valve, according to any one of claims 1 and 2-7, wherein the airflow channel of the constant pressure valve is connected to the inflation port.

* * * * *